United States Patent [19]
Coiro, Sr. et al.

[11] Patent Number: 5,331,920
[45] Date of Patent: Jul. 26, 1994

[54] COMBINATION CAGE AND WATERING DEVICE PERMITTING AUTOMATIC REMOVAL OF BEDDING THEREFROM

[75] Inventors: Michael A. Coiro, Sr., Jacobstown; Dale R. Murray, Burlington, both of N.J.

[73] Assignee: Allentown Caging Equipment Co., Inc., Allentown, N.J.

[21] Appl. No.: 967,714

[22] Filed: Oct. 28, 1992

[51] Int. Cl.$^5$ .......................... A01K 1/00; A01K 7/00
[52] U.S. Cl. ....................................... 119/18; 119/72.5
[58] Field of Search ...................... 119/18, 72, 72.5, 15

[56] References Cited

U.S. PATENT DOCUMENTS

| | | |
|---|---|---|
| 3,228,377 | 1/1966 | Grassano . |
| 3,518,971 | 7/1970 | Gass et al. . |
| 3,752,124 | 8/1973 | Gabriel . |
| 3,965,864 | 6/1976 | Beltz ..................................... 119/18 |
| 4,055,147 | 10/1977 | Fletcher . |
| 4,346,672 | 8/1982 | Niki . |
| 4,458,632 | 7/1984 | Niki . |
| 4,699,088 | 10/1987 | Murray et al. . |
| 5,000,120 | 3/1991 | Coiro, Sr. et al. ..................... 119/15 |
| 5,003,922 | 4/1991 | Niki et al. ........................... 119/72.5 |

FOREIGN PATENT DOCUMENTS

| | | | |
|---|---|---|---|
| 2305126 | 10/1976 | France ................................ 119/72.5 |
| 863962 | 3/1961 | United Kingdom .................. 119/72 |

*Primary Examiner*—Gene Mancene
*Assistant Examiner*—Todd E. Manahan
*Attorney, Agent, or Firm*—Mathews, Woodbridge & Collins

[57] ABSTRACT

A watering apparatus for supplying water from an outside system to an animal confined in a cage maintains an isolation barrier and has an outlet through which animal bedding and excess water escapes when the animal stuffs bedding in the area surrounding the water supply. The cage is defined by an interior and an exterior surface, a top, a bottom, two opposing ends each having a top and a bottom portion, and two opposing sides. The apparatus includes a internal cup that passes through an aperture located in one of the two opposing ends. A slot in the internal cup allows the animal to access the outside source of water. The apparatus also includes a flexible disk with a cutaway portion and a slit to receive the outside watering system. The cutaway portion of the disk, in combination with the shape of the cup, forms an outlet on the exterior of the cage. The space between the cup and the flexible disk defines a V-shaped cavity that flares outwardly from the slot in the cup toward the backing plate and flexible disk. When an animal stuffs bedding into the area surrounding the water supply, the bedding falls downwardly from the slot, through the outlet, and away from the interior of the cage. This prevents the water valve from being clogged and prevents any excess water from leaking into the cage. The cup in combination with the backing plate and flexible disk also prevents airborne contaminants from entering into the cage.

18 Claims, 4 Drawing Sheets

COMBINATION CAGE AND WATERING DEVICE PERMITTING AUTOMATIC REMOVAL OF BEDDING THEREFROM

BACKGROUND OF THE INVENTION

1. Field of the Invention

This invention relates to a watering apparatus which allows access to an outside watering system by an animal confined in a cage, while maintaining the isolation barrier, and has an outlet for the removal of bedding stuffed in the area surrounding the water supply by the animal, thereby preventing the water valve from becoming clogged or from leaking into the cage.

2. Related Prior Art

Watering devices for supplying water from an outside system to an animal confined in a cage are known in the art. For example, U.S. Pat. No. 4,699,088 describes an animal cage assembly having an outside watering manifold for mounting on an aperture in the cage to supply an animal with water. The cage is disconnected from and reconnected to the watering system without destroying the integrity of the biologically isolated cage.

U.S. Pat. No. 4,458,632 describes a water dispenser for feeding animals having a support casing supplied with water, a water feed tube supported by the support casing, a poppet valve in the support casing to control water flow, and a guard tube supported by the support casing and extending into the cage to encompass the water feed tube. The free end part of the guard tube supports a drip trough having a bottom wall sloping downward from the inside of the cage toward the outside. Excess water dripping from the end of the water feed tube is caught by the trough and flows to the outside of the cage.

U.S. Pat. No. 4,346,672 describes a water dispenser which has a water feed tube and a feed control member for regulating the flow of water. Water is supplied automatically to the animal. Since the end wall of the cylindrical portion of the valve seat member engages with the circumferential wall of the water feed tube, leakage of water is completely prevented. Any excess water drips downward from the inner end of the feed tube onto the lower part of the interior of the guard tube and flows out of the guard tube through a drain hole at a point outside the cage.

U.S. Pat. No. 4,055,147 describes an automatic fluid dispenser which dispenses fluid only at predetermined periods of time. A drain is provided to remove the water rapidly from the system through an outlet valve.

U.S. Pat. No. 3,228,377 describes an automatic watering system for animals confined in cages. A sealing ring on the inner surface of the watering tube prevents leakage of any water past the watering tube.

Other patent references of general interest include U.S. Pat. Nos. 3,518,971 and 3,752,124 which describe an inverted water bottle inserted through the top of a cage for supplying water to an animal.

SUMMARY OF THE INVENTION

Briefly described the invention comprises a watering apparatus which allows access to an outside watering system for an animal confined in a biologically isolated cage while maintaining the isolation barrier. The apparatus also allows for the automatic removal of animal bedding through an outlet on the exterior of the cage which has been stuffed into the area surrounding the water supply by the animal.

Water is supplied to an animal through an outside watering system containing a drinking valve which passes through a watering apparatus located at one end of the cage. Each cage has an interior and an exterior surface, and includes a filter top section, a bottom section, two opposing ends each having a top and a bottom portion, and two opposing sides. Animal bedding is also typically present within the cage.

A cup for receiving the outside watering system passes through the aperture in the cage. The internal cup has a drinking valve access slot located at the back end and a rim located at the front end. A retainer plate having an aperture therein for supporting the internal cup is attached to the interior of the cage. When the internal cup is passed through the aperture and supported by the retainer plate, the slot is located on the interior of the cage and the rim is located on the exterior surface of the cage.

A flexible membrane or disk having a slit and a cut-away portion located along its edge is attached to the rim of the internal cup on the exterior surface of the cage by a backing plate having an aperture and a cut-away portion. When the disk and the internal cup are attached to the cage, the space between the disk assembly and the internal cup defines a V-shaped cavity. The V-shaped cavity tapers outwardly from the drinking valve access slot toward the disk assembly. A cover plate with an aperture and a cutaway portion is attached to the exterior of the disk assembly, and the watering apparatus is preferably attached to the cage by threaded retaining pins and resistance welded fasteners, but can be attached using machine screws and bolts.

Bedding introduced into the slot of the internal cup by the animal falls downwardly and through an outlet formed on the exterior surface of the cage by the cut-away portions of the backing plate, disk and cover plate, respectively. Because the cavity of the internal cup flares outwardly from the slot toward the disk, animal bedding stuffed into the slot which surrounds the water supply is easily and automatically removed through the outlet. Removal of animal bedding through this outlet prevents the water valve from clogging or from leaking into the cage. Because the bedding is automatically removed through the outlet, the animal is provided with a constant supply of water and is protected from the danger of water leaking into the cage while maintaining the isolation barrier.

These and other features of the invention can be further understood by reference to the following drawings.

DETAILED DESCRIPTION OF THE INVENTION

During the course of this description like numbers will be used to identify like elements according to the different figures which illustrate the invention.

Figure 1:
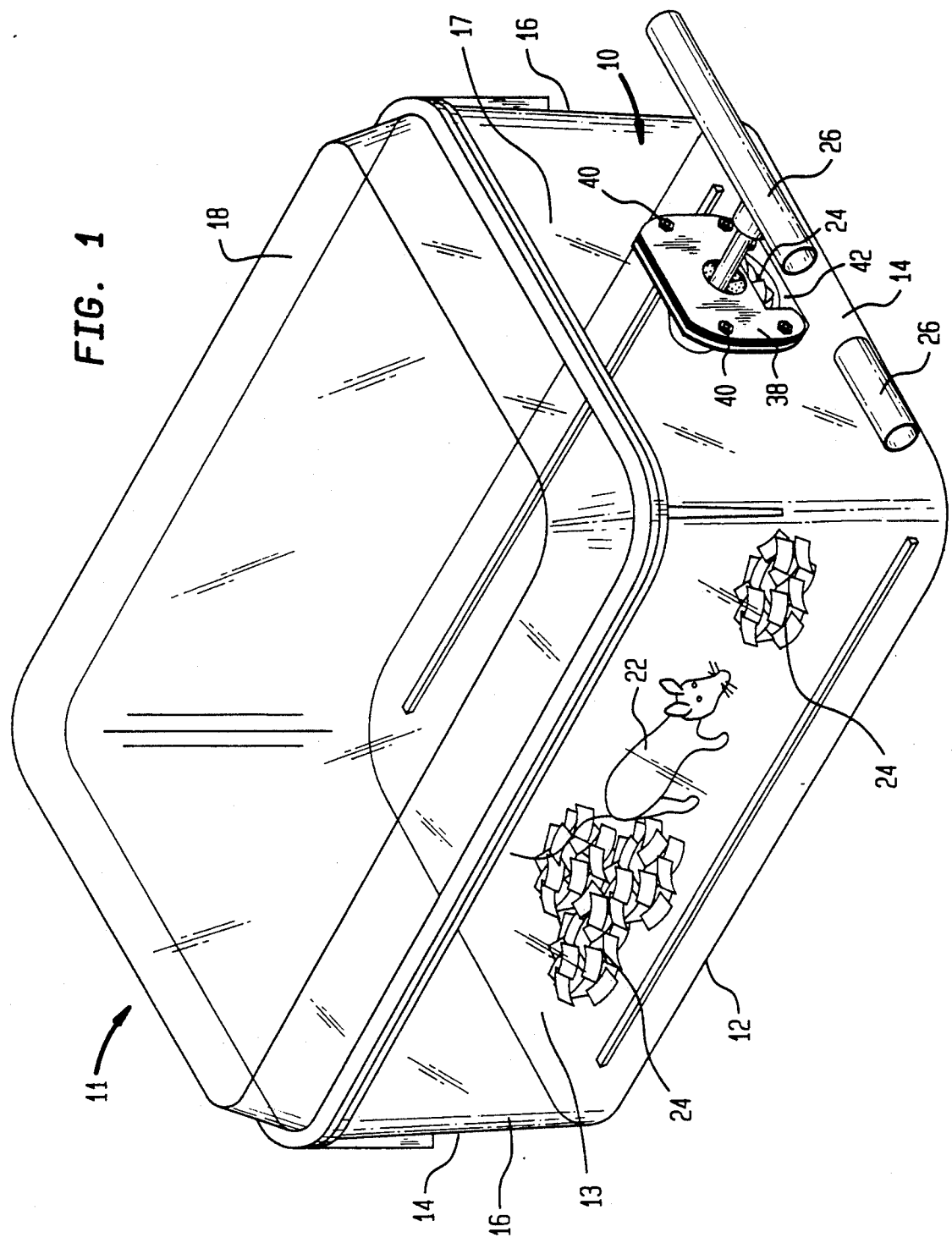
FIG. 1 is a view of the invention in context showing the outside water supply introduced into the cage and bedding falling through the outlet.

The watering apparatus 10 according to the preferred embodiment of the invention is seen in context in FIG. 1. The apparatus 10 is shown attached to a cage 11 defined by a bottom 12, two opposing ends 14, two opposing sides 16 and a top 18. A mouse 22 with bedding 24 is shown in the interior 13 of the cage 11. The cage used in the present invention is similar to the one described in U.S. Pat. No. 5,148,766. The water supply device 26 which is normally part of an outside watering system is received in the watering apparatus 10. Outlet 42 through which bedding 24 and excess water is removed is located below the water supply device 26. The apparatus 10 as shown is located near the bottom of the end 14 of the cage 11, but can be placed in any desirable location according to the needs of the user.

Figure 2:
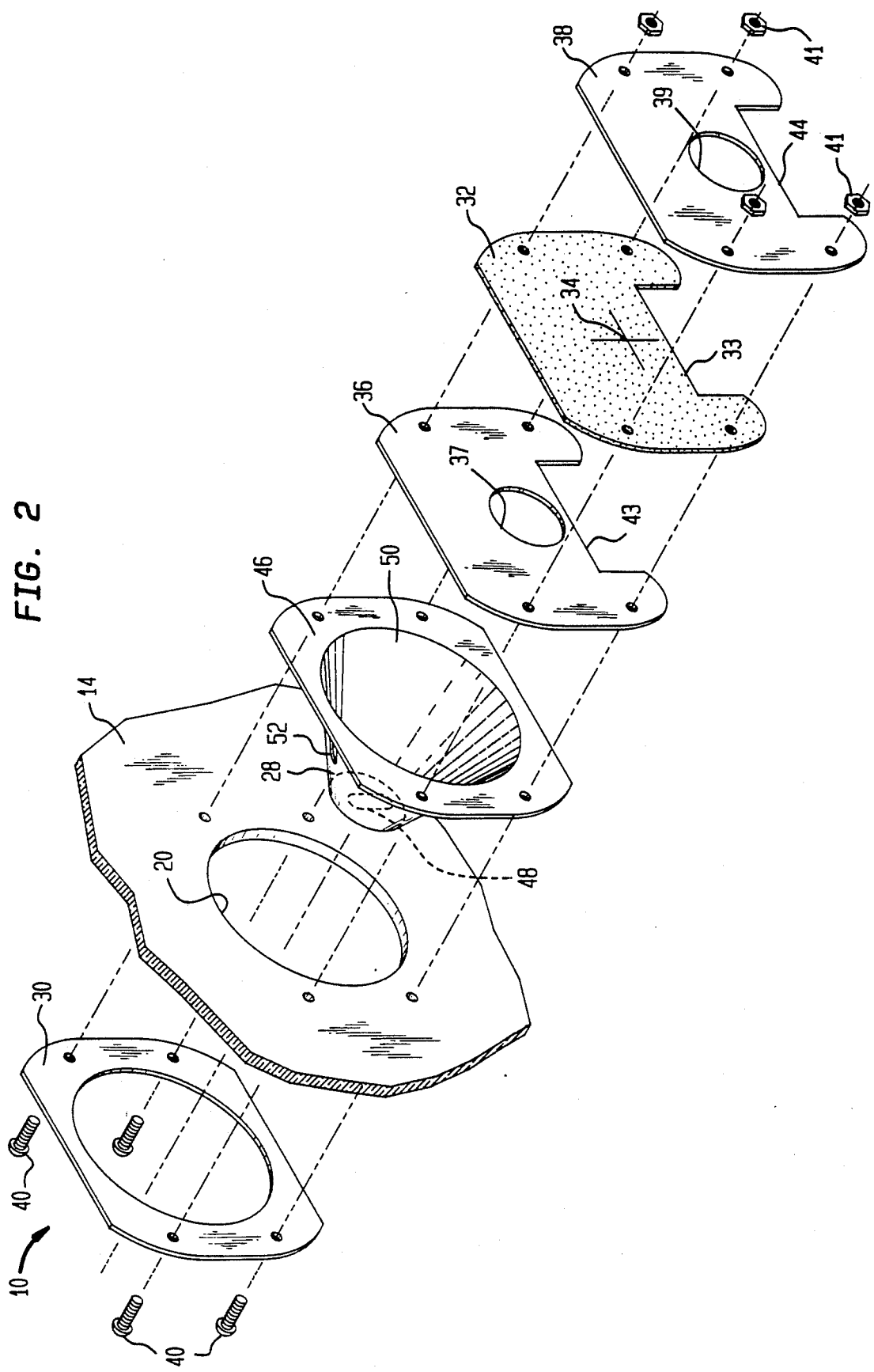
FIG. 2 is an exploded perspective view of the invention.

The watering apparatus 10 as illustrated in an exploded perspective view in FIG. 2 comprises a internal cup retainer plate 30, a internal cup 28, a backing plate 36, a flexible disk 32 and a cover plate 38. The apparatus 10 passes through an aperture 20 located in one opposing end 14 of the cage. The size of the internal cup 28 and the disk 32 can vary according to the needs of the user. The internal cup 28 is also known as a micro cup. As shown, the internal cup 28 passes through the aperture 20 in the cage and is supported on the cage by internal cup retainer plate 30. A backing plate 36 is attached to the rim 46 of internal cup 28. Flexible disk 32 is attached to the backing plate 36. Cover plate 38 is attached to the disk 32. After the apparatus 10 is assembled in the above manner, internally threaded welding fasteners 40 are spot welded 41 to cover plate 38 to attach the apparatus 10 to an opposing end 14 of the cage 11. Machine screws or bolts are also used to attach the apparatus 10 to the cage 11. Spot welding of the internally threaded fasteners is preferable, as it provides minimal interference when the cage 11 is stacked on additional cages.

Figure 3:
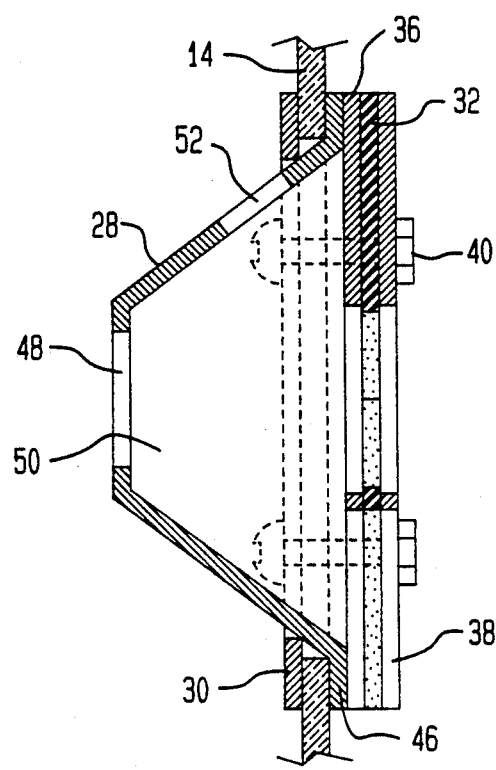
FIG. 3 is a cross-sectional side view of the invention showing the internal cup, the retainer plate, the backing plate, the disk, the cavity between the disk and the internal cup, and the cover plate attached to the cage before the water supply device is introduced.

A cross-sectional side view of the apparatus 10 when attached to the end 14 of cage 11 is shown in FIG. 3. FIG. 3 shows the arrangement of internal cup 28, internal cup retainer plate 30, rim 46, backing plate 36, flexible disk 32 and cover plate 38. The rim 46 of internal cup 28 is located at the front end of the internal cup 28 and the drinking valve access slot 48 is located at the back end of the internal cup 28. Rim 46 is located on the exterior surface 17 of the cage 11, while the drinking valve access slot 48 of internal cup 28 is located on the interior 13 of the cage 11.

Figure 4:
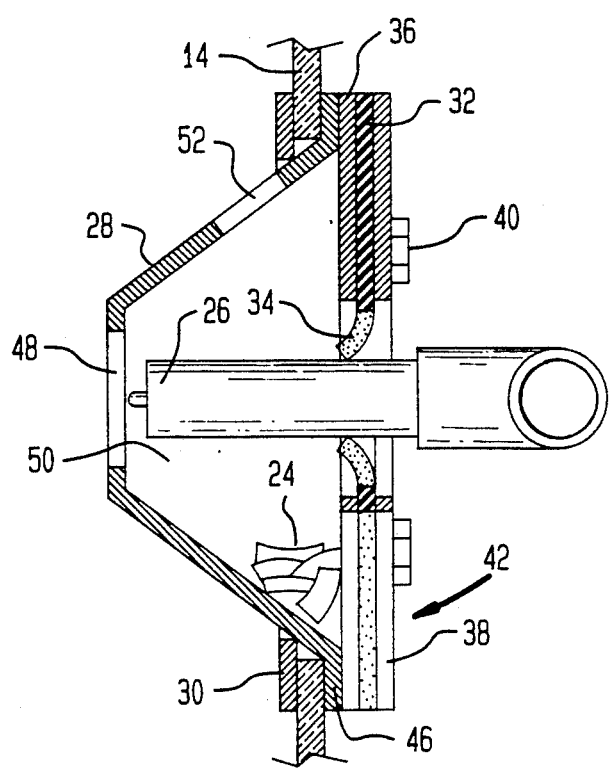
FIG. 4 is a cross-sectional side view of the invention illustrated in FIG. 3 after the water supply device is introduced, and bedding is shown near the outlet.

Fresh water is supplied to the mouse 22 through an outside water supply system 26 as shown in the cross-sectional view of the apparatus 10 in FIG. 4. The water supply system 26 is introduced into the cage 11 and received first through aperture 39 in cover plate 38, then through slit 34 in flexible disk 32, then through aperture 37 in backing plate 36 and finally into the V-shaped cavity 50. The water supply device 26 supplies multiple cages with water.

The slit 34 of disk 32 forms a reclosable entrance for permitting the water supply device 26 to be introduced. When the water supply device 26 is removed, the slit 34 closes to maintain the isolated environment of the cage 11 and to prevent airborne contaminants from entering the cage 11.

When internal cup 28 and disk 32 are attached to the cage 11, a V-shaped cavity 50 is defined by the space between the internal cup 28 and the backing plate 36 and the flexible disk 32. The V-shaped cavity flares outwardly from the drinking valve access slot 48 to the backing plate 36. When the mouse 22 stuffs bedding 24 in the area between the water supply device 26 and the drinking valve access slot 48 in internal cup 28, the bedding 24 in the V-shaped cavity 50 is expelled through outlet 42 and away from the cage 11. The V-shaped cavity 50 prevents excess water from leaking into the cage 11. The water supply device 26 is placed at a predetermined distance from the slot 48 so that excess water will escape through outlet 42 and not into the cage 11.

Mouse isolation barrier cages are normally isolated from the environment to prevent airborne contaminants from entering the cage. The shape of the cavity 50, the location of the outlet 42 and the reclosable slit 34 of disk 32 prevent such airborne contaminants from entering the isolated environment of the cage.

Figure 5:
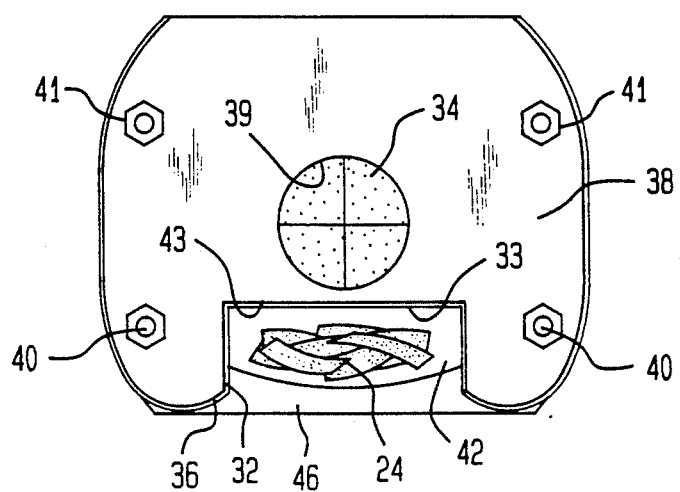
FIG. 5 is a front perspective view of the invention showing the aperture of the cover plate, the slit in the disk, and bedding near the outlet.
Figure 6:
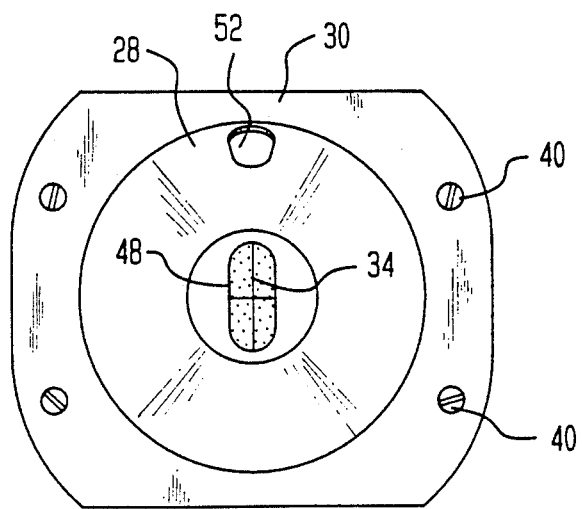
FIG. 6 is a rear perspective view of the invention showing the drinking valve access slot in the internal cup, the internal cup retaining plate and the aperture in the internal cup.

Details of the present invention 10 are illustrated in further detail in FIGS. 5 and 6. FIG. 5 is a front perspective view of the invention 10 illustrating bedding 24 in the outlet 42. FIG. 5 shows rim 46 of internal cup 28 attached to cover plate 38 and to flexible disk 32 and backing plate 36. As previously described, V-shaped cavity 50 defined by the space between flexible disk 32, backing plate 36, and internal cup 28 permits the automatic removal of animal bedding 24 through the outlet 42.

The outlet 42 of the apparatus 10 is formed by the cutaway portion 33 of the disk 32 when the disk 32 is attached to the internal cup 28 as shown in FIG. 5. Referring also to FIG. 2, the outlet 42 is further defined by the cutaway portion 43 of the backing plate 36 and the cutaway portion 44 of the cover plate 38 when the apparatus 10 is attached to the cage 11.

Cover plate 38 has an aperture 39 for receiving the outside water supply device 26. Slit 34 of disk 32 forms a reclosable entrance for introducing the water supply device 26. Backing plate 36 has an aperture 37 through which the water supply device 26 is received.

FIG. 6 is a rear perspective view of the invention 10. The internal cup retainer plate 30 is shown secured to the internal cup 28. The slit 34 of the disk 32 can be seen through drinking valve access slot 48. As previously discussed, a water supply device 26 is introduced in the slit 34 which the animal can access through drinking valve access slot 48 in the internal cup 28. The typical mouse 22 frequently stuffs bedding 24 in the space between the water supply device 26 and the drinking valve access slot 48. The bedding 24 escapes downwardly through the V-shaped cavity 50 of the internal cup 28 and out through the outlet 42 while maintaining an isolation barrier to eliminating entrance of airborne contaminants. Biologically isolated cages are typically passed through washers to keep the cages clean. An aperture 52 permits water to flow therethrough when the watering apparatus 10 is cleaned. When the cage 11 is put through the washing cycle, water, the aperture 52 allows water to flow therethrough.

In the illustrated embodiments, unless otherwise specified, the components of the apparatus are stamped from sheet metal and assembled by welding or mechanical fasteners to the cage 11. It is contemplated that the flexible disk 32 may be injection molded or cut from a flexible material such as plastic or silicone. All components can be autoclaved for sterilization purposes.

In summary, the watering apparatus 10 provides a supply of water to a mouse 22 confined in a cage 11 while maintaining an isolation barrier by eliminating the entrance of airborne contaminants into the cage 11. The water supply device 26 does not become clogged when the mouse 22 stuffs animal bedding 24 in the area surrounding the drinking valve access slot 48 of the internal cup 28 and the water supply device 26. Animal bedding 24 inserted in the drinking valve access slot 48 escapes through the lower part of the V-shaped cavity 50 of the internal cup 28 and is easily removed through an outlet 42 formed on the exterior surface 17 of the cage 11. The V-shaped cavity 50 also prevents water from leaking into the cage 11. Any excess water from the water supply device 26 will escape through the outlet 42.

While the invention has been described with reference to the preferred embodiment thereof, it will be appreciated by those of ordinary skill in the art that modifications can be made to the structure and form of the invention without departing from the spirit and scope thereof.

I claim:

1. A combination cage and watering apparatus which allows the supply of water from an outside watering system to an animal confined in an isolation cage containing animal bedding while preventing the entrance of airborne contaminants and which passes through an aperture in a cage defined by a top, a bottom, an interior and an exterior surface, two opposing ends, each opposing end having a top and a bottom portion, and two opposing sides, said apparatus comprising:
    an internal cup having a front end and a back end, which tapers outwardly from said back end toward said front end, and which passes through said aperture, said internal cup including a slot located at said back end for allowing said animal to receive water from an outside watering valve;
    access port means in said internal cup for receiving said outside watering system to supply water to said animal; and,
    bedding removal means,
    wherein when said animal bedding is stuffed through said slot by said animal, it automatically passes through said bedding removal means thereby preventing said outside watering valve from becoming clogged with said animal bedding.

2. The apparatus of claim 1 wherein said internal cup is located at one of said two opposing ends of said cage.

3. The apparatus of claim 2 wherein said internal cup is located near said bottom portion of one of said two opposing ends.

4. The apparatus of claim 3 wherein said internal cup further includes a rim located at said front end of said internal cup.

5. The apparatus of claim 4 wherein said rim of said internal cup is secured on said exterior surface of said cage.

6. A combination cage and watering apparatus which supplies water from an outside watering system having a valve to an animal confined in an isolation cage containing animal bedding, said cage defined by a top, a bottom, an interior and an exterior surface, two opposing sides, two opposing ends, each opposing end having a top and a bottom portion, and an aperture, said apparatus comprising:
    an internal cup having a front end and a back end which passes through said aperture, said internal cup being located in one of said two opposing ends near said bottom portion of said one opposing end, said internal cup including a slot located at said back end and a rim located at said front end, said rim being secured on said exterior surface of said cage;
    access port means secured to said rim of said internal cup for receiving said outside watering system, said access port means including a flexible disk having a slit and a cutaway portion, said slit forming a reclosable entrance for permitting said valve of said outside watering system to be introduced therethrough to provide a supply of water to said animal while preventing the entrance of airborne contaminants thereby maintaining the isolation barrier of said cage; and,
    bedding removal means including an outlet formed on said exterior surface of said cage by said cutaway portion of said flexible disk,
    wherein when said animal bedding is stuffed through said access port means by said animal, said animal bedding automatically passes through said bedding removal means thereby preventing said valve of said outside watering system from becoming clogged with said animal bedding.

7. The apparatus of claim 6 wherein a V-shaped cavity is defined by the space between said internal cup and said flexible disk and flares outwardly from said slot of said internal cup towards said flexible disk.

8. The apparatus of claim 7 wherein when said internal cup is passed through said aperture of one of said two opposing ends of said cage, said apparatus further comprises:
    a internal cup retainer plate attached to said interior surface of said cage;
    a backing plate attached to said rim of said internal cup, said disk being attached to said backing plate;
    a cover plate attached to said disk; and,
    attachment means,
    wherein said attachment means attach said apparatus to 9. The apparatus of claim 8 wherein said internal cup retainer plate has an aperture for receiving said internal cup.

10. The apparatus of claim 9 wherein said backing plate has a cutaway portion and an aperture for receiving said outside watering system valve.

11. The apparatus of claim 10 wherein said cover plate has a cutaway portion and an aperture for receiving said outside watering system valve.

12. The apparatus of claim 11 wherein said outlet is defined by said cutaway portion of said backing plate and said cutaway portion of said cover plate.

13. The apparatus of claim 12 wherein said internal cup further includes an aperture through which water passes when said cage is washed.

14. A watering apparatus for an animal confined in a cage containing animal bedding, said apparatus comprising:
    a cup having a front and a back;
    access port means in said cup for receiving an outside watering system;
    a slot located at said back of said cup; and,
    bedding removal means located at said front of said cup for the automatic removal of bedding,
    wherein when said animal bedding is stuffed through said slot by said animal, said animal bedding automatically passes through said bedding removal means thereby preventing said outside watering system from becoming clogged with said animal bedding.

15. The apparatus of claim 14 wherein said access port means includes a flexible disk having a slit and a cutaway portion, said slit forming a reclosable entrance for permitting said outside watering system to be introduced therethrough to provide a supply of water to said animal.

16. A watering apparatus for an animal confined in a cage containing animal bedding, said apparatus comprising:
    a cup having a front and a back, said cup including a slot located at said back for allowing said animal to receive water from said outside watering system;
    access port means in said cup for receiving an outside watering system, said access port means including a flexible disk having a slit and a cutaway portion, said slit forming a reclosable entrance for permitting said outside watering system to be introduced therethrough to provide a supply of water to said animal; and,
    bedding removal means located at said front of said cup,
    wherein when said animal bedding is stuffed through said slot by said animal, said animal bedding automatically passes through said bedding removal means thereby preventing said outside watering system from becoming clogged with said animal bedding.

17. The apparatus of claim 16 wherein said bedding removal means includes an outlet formed by said cutaway portion of said flexible disk so that when said animal bedding is stuffed through said slot, said animal bedding is removed through said outlet.

18. A combination cage and watering apparatus which allows the supply of water from an outside watering system to an animal confined in an isolation cage containing animal bedding while preventing the entrance of airborne contaminants and which passes through an aperture in a cage defined by a top, a bottom, an interior and an exterior surface, two opposing ends, each opposing end having a top and a bottom portion, and two opposing sides, said apparatus comprising:
    an internal cup having a front end and a back end which passes through said aperture, said cup located at one of said two opposing ends of said cage near said bottom portion of said one opposing end, said internal cup including a slot located at said back end and a rim located at said front end, said rim being secured on said exterior surface of said cage;
    access port means in said internal cup for receiving said outside watering system to supply water to said animal, said access port means including a flexible disk having a slit and a cutaway portion secured to said rim of said internal cup; and,
    bedding removal means,
    wherein said slit of said flexible disk forms a reclosable entrance for permitting said outside watering valve to be introduced therethrough to provide a supply of water to said animal while preventing the entrance of airborne contaminants thereby maintaining the isolation barrier of said cage.

* * * * *